United States Patent [19]

Hashimoto et al.

[11] Patent Number: 5,440,403
[45] Date of Patent: Aug. 8, 1995

[54] IMAGE READING MEANS FOR READING A DOCUMENT INCLUDING A PLURALITY OF IMAGES AND SPACE

[75] Inventors: Yoshiyuki Hashimoto; Shinya Uchikawa, both of Machida; Yoko Fujiwara, Zama, all of Japan

[73] Assignee: Minolta Camera Kabushiki Kaisha, Osaka, Japan

[21] Appl. No.: 94,318

[22] Filed: Jul. 21, 1993

[30] Foreign Application Priority Data

Jul. 24, 1992 [JP] Japan .................................. 4-198797
Nov. 4, 1992 [JP] Japan .................................. 4-295369
Nov. 4, 1992 [JP] Japan .................................. 4-295370

[51] Int. Cl.[6] .......................... H04N 1/21; H04N 1/387
[52] U.S. Cl. ................................ 358/444; 358/448; 358/450; 358/487; 358/488
[58] Field of Search ............... 358/406, 468, 487, 488, 358/494, 497, 453, 450, 452, 448, 444, 504, 506, 538, 537, 524; 355/218, 271, 311, 24, 54; 382/46; 395/117, 115, 116

[56] References Cited

U.S. PATENT DOCUMENTS 4,591,904 5/1986 Urabe et al. ...................... 358/448
4,839,696 6/1989 Ohtani .............................. 355/218
5,231,516 7/1993 Kamon et al. .................... 358/450

Primary Examiner—Scott A. Rogers
Attorney, Agent, or Firm—Burns, Doane, Swecker & Mathis

[57] ABSTRACT

An image reading device by which a plurality of images recorded and set in a prescribed posture on an original document are scanned by one scanning motion, changed in layout and then outputted in the changed order. The image reading apparatus includes an image reading means for reading an original document including a plurality of images and space, a distinguishing means for distinguishing the images from the space, a memory means for memorizing only the image data and an output means for outputting memorized image data in a different order.

31 Claims, 17 Drawing Sheets

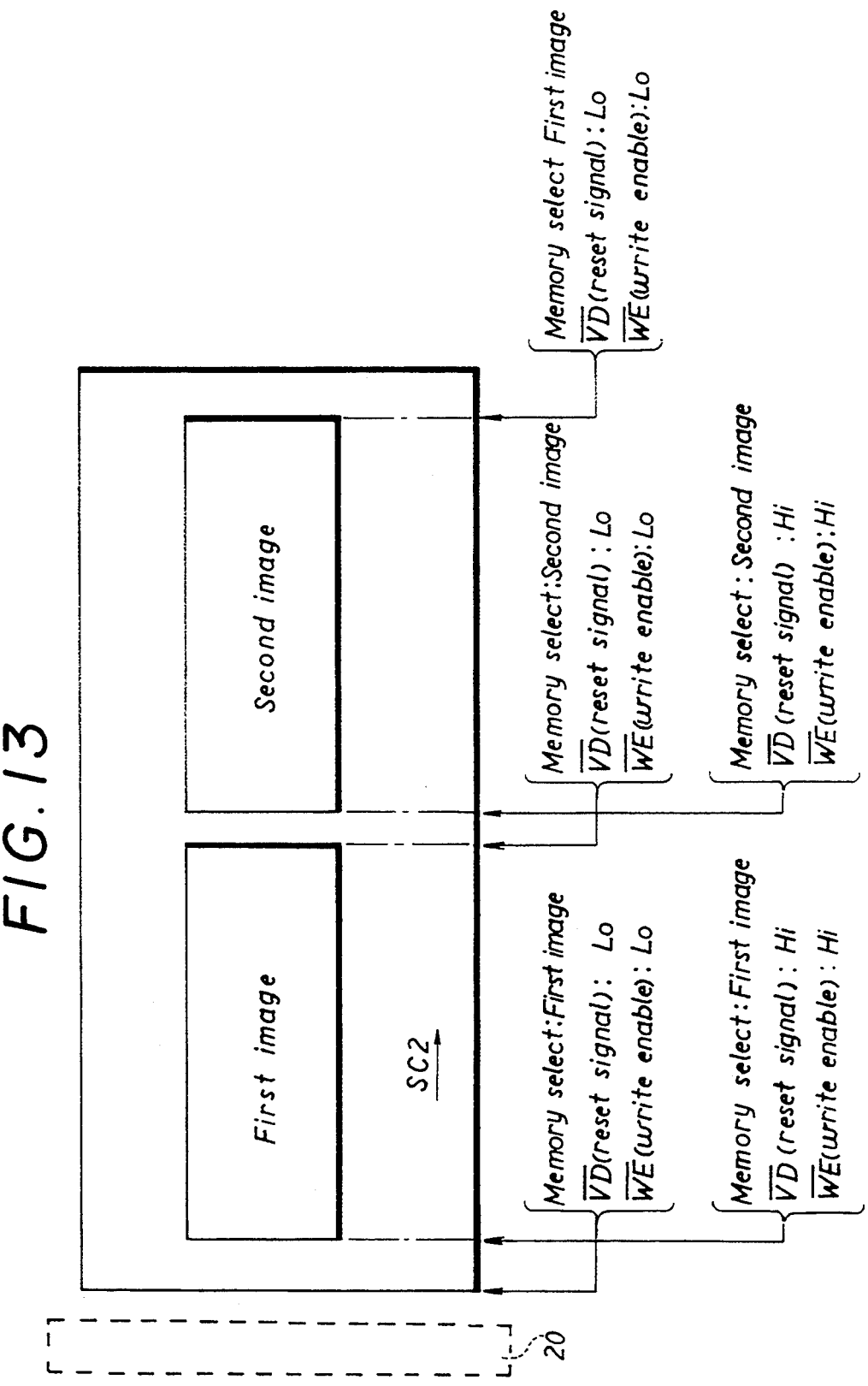

IMAGE READING MEANS FOR READING A DOCUMENT INCLUDING A PLURALITY OF IMAGES AND SPACE

BACKGROUND OF THE INVENTION

1. Field of the Invention

This invention relates to an image reading apparatus for reading a plurality of images recorded on an original document.

2. Description of the Prior Art

A microfilm scanner which reads images photographed on a microfilm is known as one of various known versions of the image reading apparatus.

The microfilm scanner is provided with a screen for allowing projection thereon of images photographed on a microfilm as an original document and a photoelectric conversion element for converting a projected image into electronic information and is adapted to image process a signal from the photoelectric conversion element and then forward the signal to an external printer, for example. This printer plays the part of printing the image on a recording paper.

Some microfilms are used for photographing therein information borne on checks. Oblong sheets of paper which measure 3⅔ inches × 17 inches are generally used for checks. In a roll of microfilm, the information, i.e. the obverse image and the reverse image of the check as a pair, are photographed in one frame and arranged in parallel relative to the direction of the width of the film.

For the purpose of enabling the information, i.e. the obverse and reverse images, of one check photographed on the microfilm to be printed out in one recording paper, the recording paper is required to be an oblong sheet of paper of a special size. The printer to be used in this case is at a disadvantage in requiring the use of a feed paper cassette and a recording paper conveying system which are different from those used in the printer for reproducing an image on a recording paper of a standard size. Moreover, the special size recording paper has the problem of being difficult to file.

Generally a rotary camera is used for photographing checks on the microfilm in such a manner that the obverse and reverse images of each check as a pair are arranged laterally in the width direction of the film (hereinafter the microfilm produced in this pattern will be referred to as "duplex type microfilm"). When the check being photographed happens to be inclined, it is photographed in the inclined state.

The obverse image and the reverse image photographed from the inclined check are inclined in mutually opposite directions. When these images are read out by a microfilm scanner and printed on recording paper, the printed observe and reverse images are oppositely inclined and, therefore, unsightly in appearance.

When a plurality of checks gathered in a stack are to be photographed on a microfilm, there are times when some of them are possibly placed upside down in the stack. The obverse and reverse images photographed from such a stack of checks into a microfilm are in the order of obverse and reverse sides in some cases and in the order of reverse and obverse sides in other cases relative to the sequence of the reading of the information by the microscanner. As a natural consequence, the images reproduced on the recording papers are in the order of obverse and reverse sides in the former cases and in the order of reverse and obverse sides in the latter cases. Thus, the information obtained on the recording papers lacks uniformity.

In order to solve the problem described above, a method which comprises severally reading out a plurality of images photographed on a given frame of microfilm, putting these images to temporary storage in a memory, synthesizing them during the process of retrieval from the memory, and printing the synthesized images has been previously used. This method, for example, is aimed at arranging images of information in parallel and printing them so arranged on ordinary size recording paper or, when the reverse and obverse images are placed in the reverse order, changing the order of reading of these images and printing the images in the changed order.

When a microfilm happens to contain among the images photographed therein those which are inclined, this method operates with the steps of preliminarily scanning the images and detecting those inclined images, severally correcting the inclinations of the detected images, and reading again severally the images inclusive of those with corrected inclinations. When one frame of film contains a plurality of images, however, the reading of images consumes a lot of time because the preliminary scanning intended to detect an inclination in an image must be carried out once for each of the plurality of images and the regular scanning must be carried out once for each of the images to be involved.

Thus, any of such conventional methods as described above is at a disadvantage because the reading of images consumes a lot of time and the operation of reading does not proceed smoothly because the scanning operation for reading an image must be performed as often as many images are photographed on one frame of film.

SUMMARY OF THE INVENTION

This invention aims to provide an image reading apparatus which is free from the various problems suffered by the conventional methods as described above. The first object of this invention consists in causing a plurality of images recorded and set in a prescribed posture on an original document to be changed in layout by one scanning motion and then put out of storage in an arbitrarily changed order.

The second object of this invention consists in enabling a plurality of images recorded on an original document, even when they happen to contain an image recorded in an inclined posture, to be erected upright by one scanning motion.

The third object of this invention consists in causing a plurality of images recorded on an original document to be projected on a screen and, when the projected images happen to contain a projected image in an inclined posture, correcting the image in the inclined posture on a screen, and reading the images each in an erected state.

The first aspect of this invention which resides in accomplishing the first object described above is directed to an image reading apparatus which comprises image reading means for reading a plurality of images recorded at prescribed positions on a single original document by one scanning motion, memory means for memorizing the plurality of images read out by the image reading means, and output means for putting out the plurality of images memorized in the memory means in an order different from the order in which the images were placed on the original document.

The second aspect of this invention which resides in accomplishing the second object described above is directed to an image reading apparatus which comprises image reading means for reading out a plurality of images recorded in one single original document by one scanning motion, judging means for judging the inclination of each of the plurality of images read out by the image reading means, output means for putting out the plurality of images read out by the image reading means, and correcting means for correcting the inclination of each of the plurality of images in accordance with the result of judgment made as to inclination by the judging means.

The third aspect of this invention which resides in accomplishing the third object described above is directed to an image reading apparatus which comprises projecting means for collectively projecting a plurality of images recorded on one single original document on a screen, image rotating means for rotating the images projected on the screen around the optical axis of the projecting means as the center, judging means for judging the inclination of each of the plurality of images projected on the screen, image reading means for reading out the plurality of images projected on the screen in the direction of arrangement thereof by one scanning motion, and driving means for driving the image rotating means so as to erect upright the images on the screen immediately before each of the plurality of images is read out based on the result of judgment made by said judging means.

BRIEF DESCRIPTION OF THE DRAWINGS

FIG. 13 is a front view illustrating the position of an image sensor and the timing of a signal sent to a control circuit.

DETAILED DESCRIPTION OF THE PREFERRED EMBODIMENT

The first aspect of this invention will be described in detail below with reference to a diagram illustrating a microfilm scanner as an embodiment of this invention.

Figure 1:
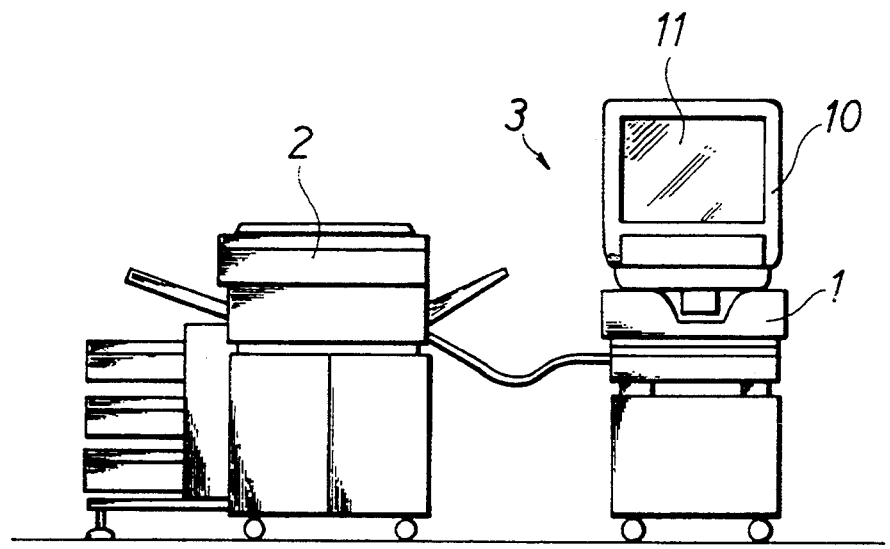
FIG. 1 is a front view illustrating a digital micro-reader-printer as one version of the image reading apparatus of this invention.

FIG. 1 depicts the appearance of the system of a digital micro-reader-printer 3 (hereinafter referred to briefly as "DMP") which is constructed by combining a microfilm scanner 1 and a laser beam printer 2 (hereinafter referred to briefly as "LBP").

The original document to be used herein is a microfilm of the aforementioned duplex type. The images are a pair of images photographed on the microfilm.

Figure 2:
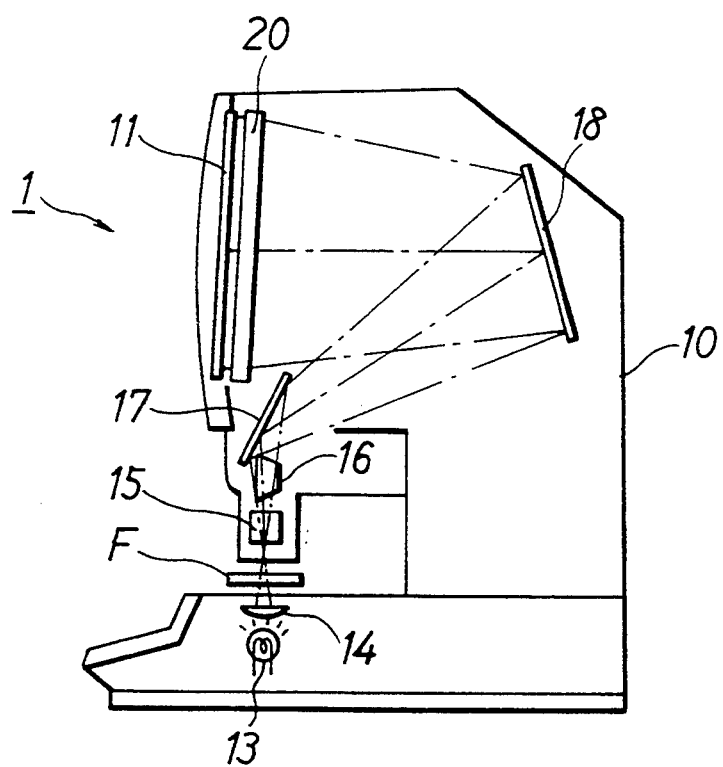
FIG. 2 is a cross section illustrating the inner construction of, a microfilm scanner shown in FIG. 1.
Figure 3:
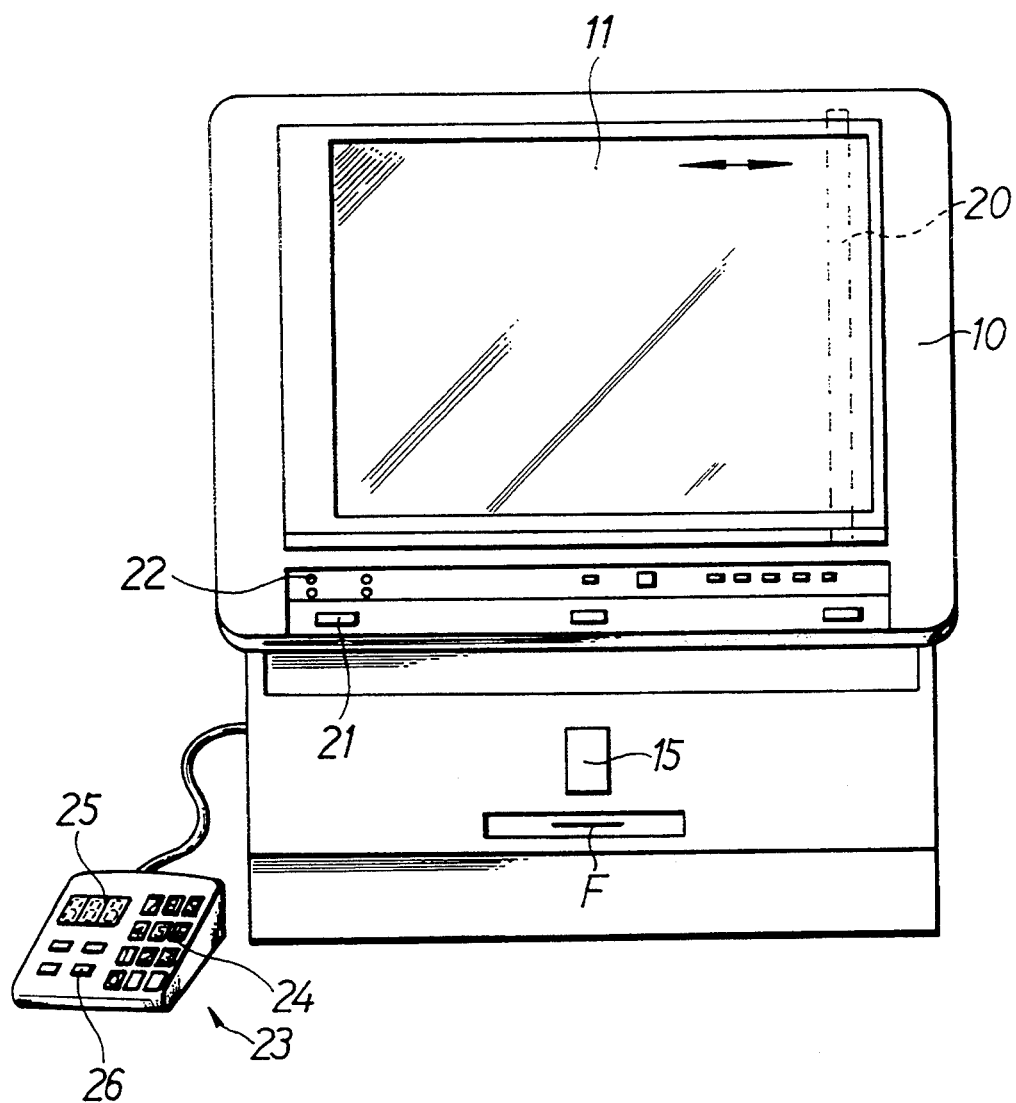
FIG. 3 is a front view of the scanner shown in FIG. 2.

The scanner 1 is a device for reading out images of the original document photographed in the microfilm and the LBP 2 is a device for printing on a recording paper the image data read out as described above. A housing 10 for the scanner 1 is provided, as illustrated in FIG. 2 and FIG. 3, on the front side thereof with a screen 11 and below the screen 11 with means for loading a duplex type microfilm F which is supported by a film carrier (omitted from illustration).

In the lower part of the housing 10 is a lamp 13 as a light source. The light emitted from this lamp 13 is condensed by a condenser lens 14 and projected onto the microfilm F.

Above the microfilm F are disposed a projecting lens 15 and a prism 16 serving the purpose of rotating the image. The light which has passed through the prism 16 is reflected by a first mirror 17 and a second mirror 18, with the result that the image copied in the microfilm F is projected on the screen 11.

On the rear surface side of this screen 11, an image sensor 20 for reading the image data projected on the screen 11 is set in place. This image sensor 20 is composed of CCD line sensors each having CCD elements linearly arranged in the vertical direction as illustrated in FIG. 3. This image sensor 20 scans the image data by moving in the lateral direction as indicated by the arrow mark in the diagram.

The scanning with the image sensor 20 need not be limited to the method illustrated in FIG. 3. Any of various known methods such as, for example, a film scanning method which moves a film relative to the sensor and a mirror scanning method which moves a mirror relative to the sensor can be adopted instead.

On the front side of the scanner 1, as illustrated in FIG. 3, a print key 21 for commanding the start of printing and a LED22 for displaying a print mode are disposed and a control box 23 for controlling such as margins within a recording paper during the production of an image is also set in place. The control box 23 is provided with for example a ten key 24, an LED display panel 25, and a margin setting key 26.

Figure 4:
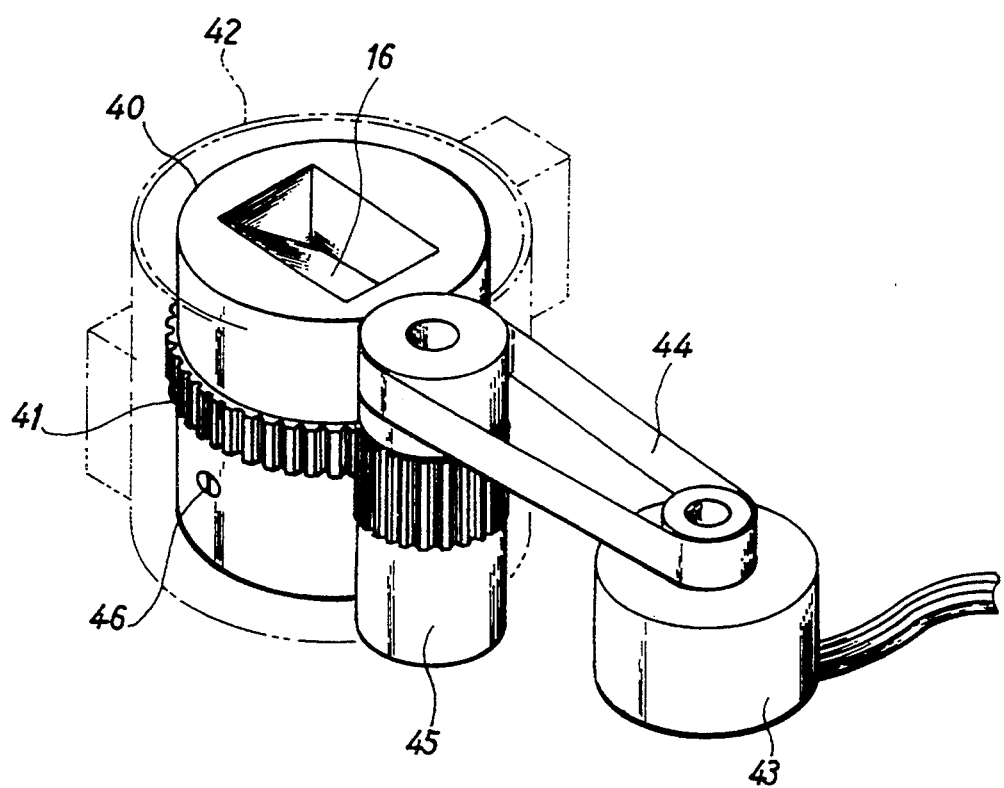
FIG. 4 is a perspective view of the mechanism of rotation of a prism incorporated in the scanner shown in FIG. 2.

FIG. 4 is a perspective view illustrating the mechanism for driving the image rotating prism 16 which is disposed inside the scanner 1. The prism 16 is attached to a cylindrical member 40 which is provided on the lateral side thereof with a toothed part 41. This prism 16 is rotatably supported inside an outer cylinder 42. The outer cylinder 42 is provided with a cutaway at the part corresponding to the toothed part 41. A pinion 45 which is driven by a pulse motor 43 through the medium of a belt 44 is meshed with the toothed part 41.

The prism 16 is rotated by an angle proportionate to a desired number of pulses supplied to the pulse motor 43. When the prism 16 is rotated by 90°, for example, the image projected on the screen 11 is rotated by 180°. With respect to the images which have been photographed in the part of the film F within an area indicated by an alternate one-long and one-short dash line in FIG. 5, these images are projected in a posture illustrated in FIG. 6 on the screen 11 when the prism 16 is rotated by 90°.

Figure 5:
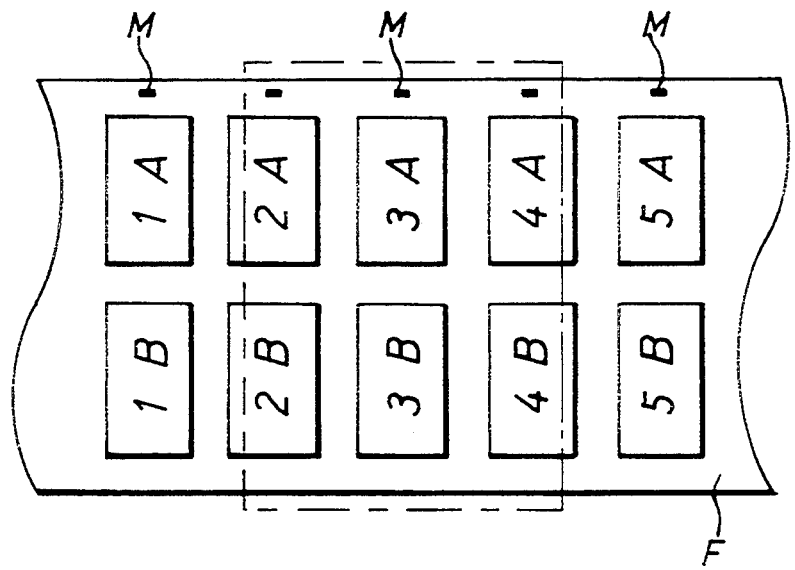
FIG. 5 is a plan view illustrating one example of part of a microfilm having a plurality of image frames copied linearly therein.

FIG. 5 depicts part of a roll of microfilm F of the duplex type which is loaded in the scanner 1 described above. This part represents the obverse and reverse images contained in a total of five checks. In this diagram, the parts labelled with the suffix A contain obverse images of the checks and the parts labelled with the suffix B the reverse images of the checks and the symbols M each represent a blip mark attached to an image frame containing an obverse and a reverse image as a pair.

Figure 7:
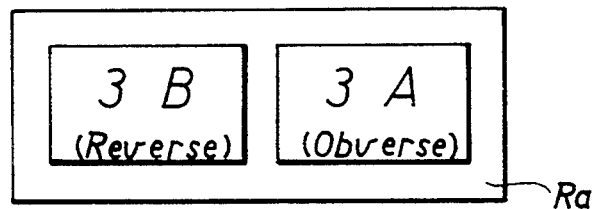
FIG. 7 is a plan view illustrating a recording paper on which a plurality of images are printed as linearly arranged.

FIG. 7 represents a case in which an obverse image 3A and a reverse image 3B on one check are printed on one recording paper Ra of a special size by the conventional technique mentioned above. In this case, since the regular scanning for reading images is made in the direction from left to right, the image of 3B (reverse) is read in first and the image of 3A (obverse) is then read in and the reverse and obverse images are put out in the order mentioned on the recording paper Ra.

FIG. 8 represents a case in which an obverse image 3A and a reverse image 3B of a check are printed as arranged in parallel by the conventional technique on a recording paper R of A4 size or letter size. In this case, the two images 3A and 3B projected on the screen 11 are printed by scanning the screen 11 twice in the direction from the upper to the lower side thereof. First, the obverse image 3A is scanned and the relevant image data are put to storage in the memory. Then, the reverse image 3B is scanned and the relevant image data are synthesized with those read out formerly to produce on the recording paper R the two images 3A and 3B arranged in parallel.

The method just described requires the scanning operation twice and puts out the obverse and reverse images in the order mentioned and, therefore, necessitates change of the scanning order depending on the relative positions of the images photo-graphed in the microfilm. Thus, this method has the disadvantage of consuming a lot of time in reading out images and suffers from poor workability.

Figure 8A:
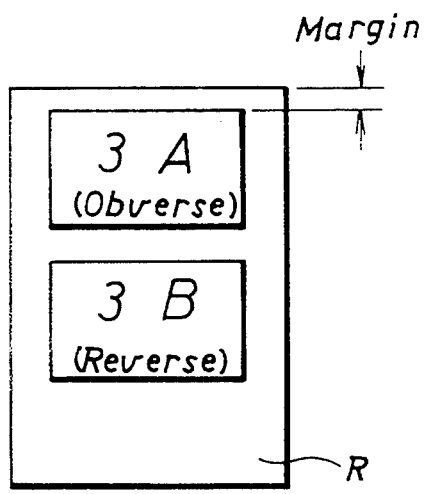
FIGS. 8(a) and 8(b) are plan views illustrating a recording paper on which a plurality of images are printed as arranged in parallel.
Figure 8B:
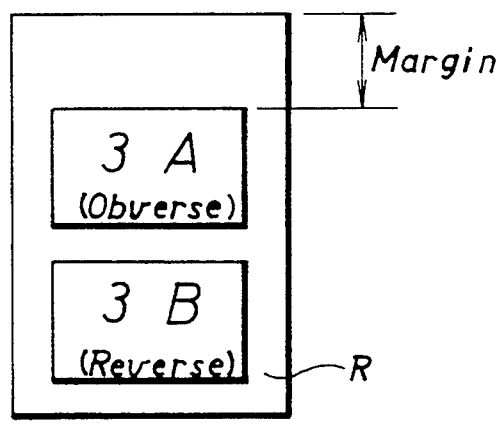

In the present embodiment, just one regular scanning motion suffices to produce on the recording paper two images arranged parallel as illustrated in FIG. 8. This embodiment further permits a suitable margin to be freely set as illustrated in FIG. 8(a) or FIG. 8(b) before the images are put out on the recording paper R.

Figure 9:
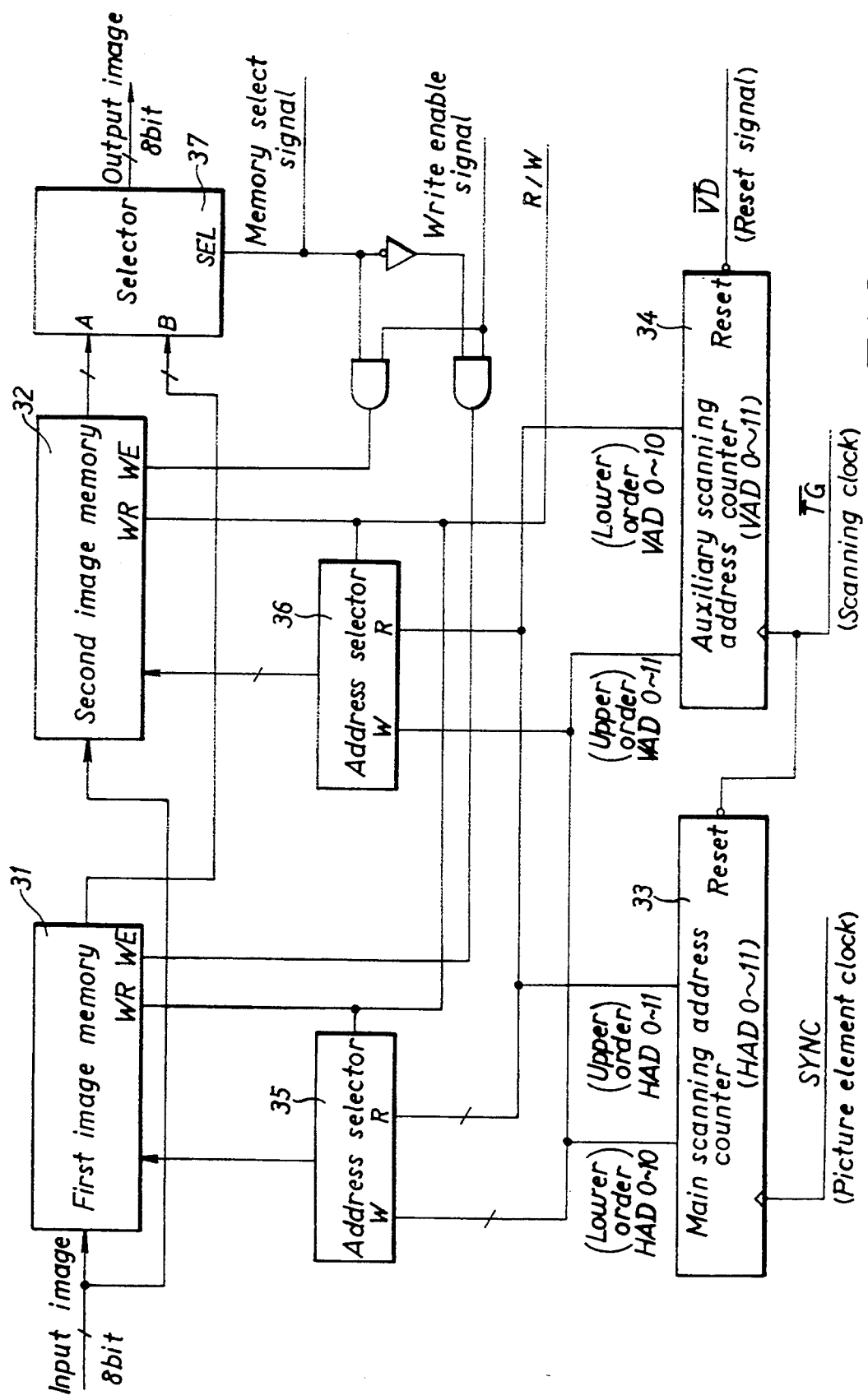
FIG. 9 is a block diagram illustrating a control circuit for an image reading apparatus.

FIG. 9 is a block diagram illustrating the hardware of the image recording apparatus described above. This image reading apparatus is composed chiefly of a first image memory 31 for storing the image data to be read for the first time out of the pair of obverse and reverse images, a second image memory 32 for storing the image data to be read out subsequently, a main scanning address counter 33 and an auxiliary scanning address counter 34 for generating addresses for the image memories mentioned above, address selectors 35 and 36 for interchanging the addresses generated by the address counters mentioned above when the addresses are written in and when they are read out, and a selector 37 for selecting a memory for the storage of image data required for enabling an image to be put out at a desired position on a recording paper.

FIG. 9 depicts one example of the hardware adapted to handle image data in the 8-bit notation (256 intensity levels). The image data, when necessary, may be in the 1-bit notation (binary data). In this case, the capacity for memory may be one eighth of that which is used in the hardware illustrated in FIG. 9.

Now, the operation of reading out images from a microfilm and the operation of putting out the images on a recording paper will be described below with reference to the flow charts illustrated in FIGS. 10 to 12.

Figure 10:
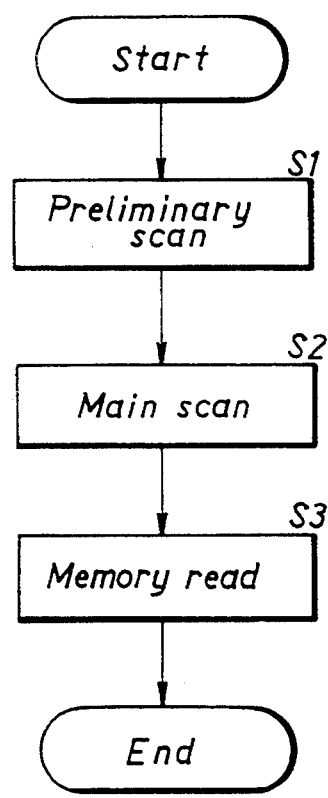
FIG. 10 is a flow chart illustrating the state of operation of an image reading apparatus.

The basic operation of the image reading apparatus is broadly divided into a preliminary scanning (S1), a regular scanning (S2), and a memory reading (S3) as illustrated in FIG. 10. By the step S1 for preliminary scanning, representative values (sample points) of image data are collected to detect the sizes and positions of the obverse and reverse images and, at the same time, determine the amount of exposure during the regular scanning.

At the step S2 for regular scanning, the image data on the obverse side are written in the first image memory 31 and the image data on the reverse side are written in the second image memory 32. Then, at the step S3 for reading out memory, the data in the first image memory 31 and the data in the second image memory 32 are severally rotated by 90° and are put out in a desired order at desired positions on the recording paper.

Figure 11A:
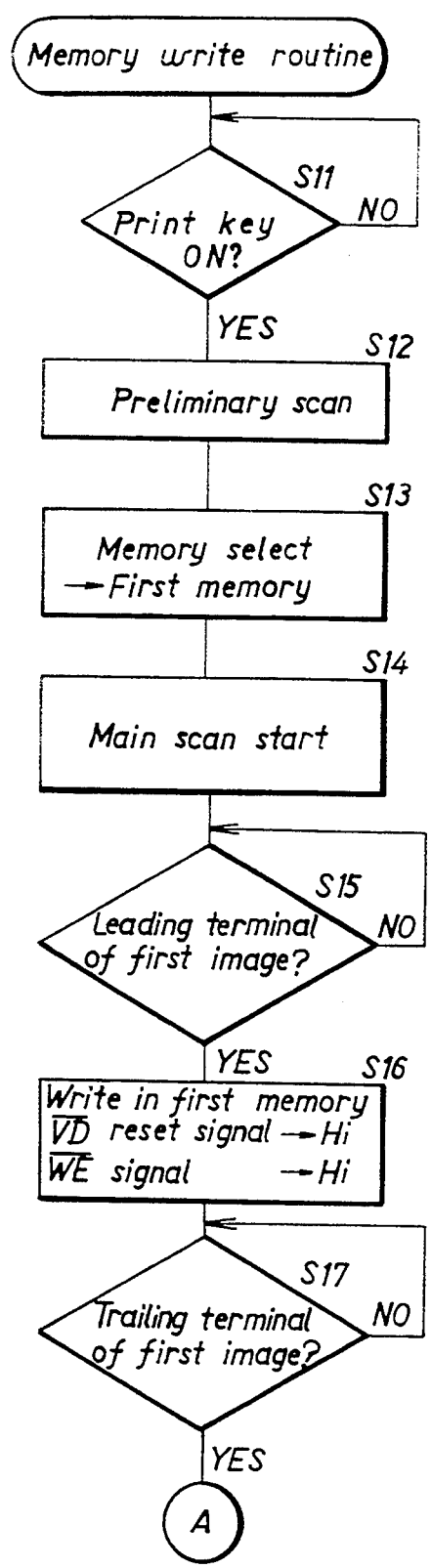
FIG. 11 is a flow chart illustrating a memory writing routine.
Figure 11B:
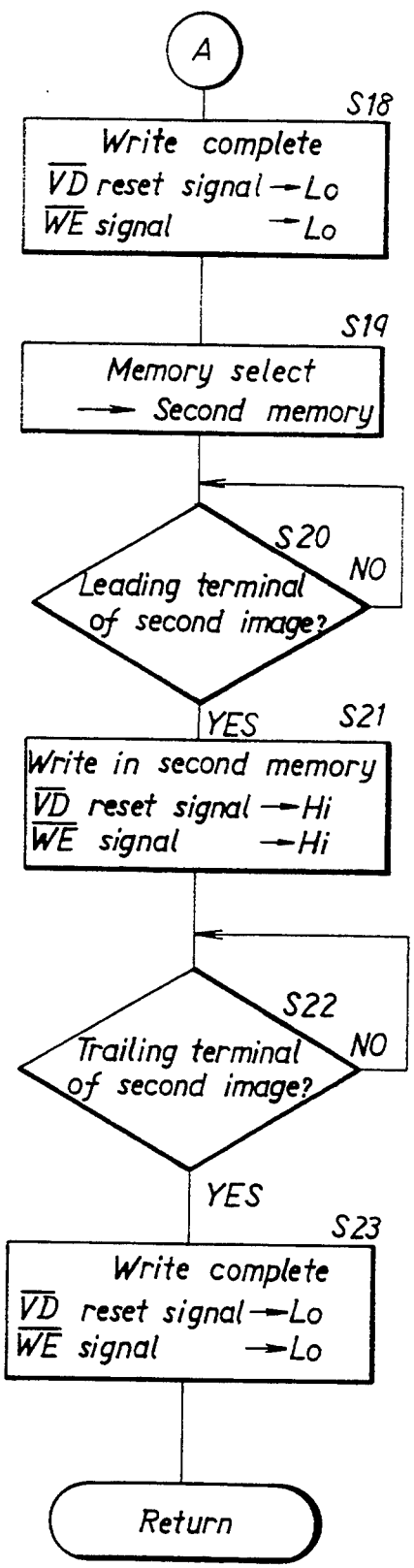

The routine for writing image data in memory inclusive of the preliminary scanning is designed as illustrated in FIG. 11. The print key 31 is turned on (S11) to transfer the image data projected on the screen 11 to the printer 2 and reproduce them on the recording paper. When the fact that the key 21 has been turned on is discerned, the preliminary scanning is executed (S12) and the image sensor 20 is set to scanning motion in the direction indicated by the arrow SC1 in FIG. 6. When the preliminary scanning is completed, the memory select signal is issued to select the first image memory 31 as a memory for writing in the image data read in the first surface (S13) and the image sensor 20 initiates the regular scanning motion and moves in the direction of the arrow SC2 (S14).

When the fact that the image sensor 20 has reached the position of the leading terminal of the first image (3B) is sensed by the regular scanning motion (S15), the reset signal and the write enable signal are both set to Hi and the writing of image data in the first image memory 31 is executed (S16). When the fact that the image sensor 20 has reached the position of the trailing terminal of the first image is sensed (S17), the reset signal and the write enable signal are both set to Lo and the writing of image data is completed (S18). By the same token, the data of the second image are written in the second image memory 32 by the execution of the steps S18 to S23.

The images which have been read out as described above are then so processed in the case of the illustrated embodiment that the image on the reverse side of the check (3A) is written in the first image memory 31 as a first image and the image on the obverse side (3A) is written in the second memory 32 as a second image.

After the image data have been written in the two memories 31 and 32, the image data are read out as synchronized with the conveyance of a recording paper in the laser beam printer 2. In this case, the location of the image on the recording paper is effected by means of the control box 23. In the illustrated case, since the reverse side (3B) of the check is read in as the first image and the obverse side (3A) as the second image, the apparatus is so programmed that the obverse side is printed first on the recording paper and, at the same time, the margin is set in the recording paper.

Figures 12A, 12B:
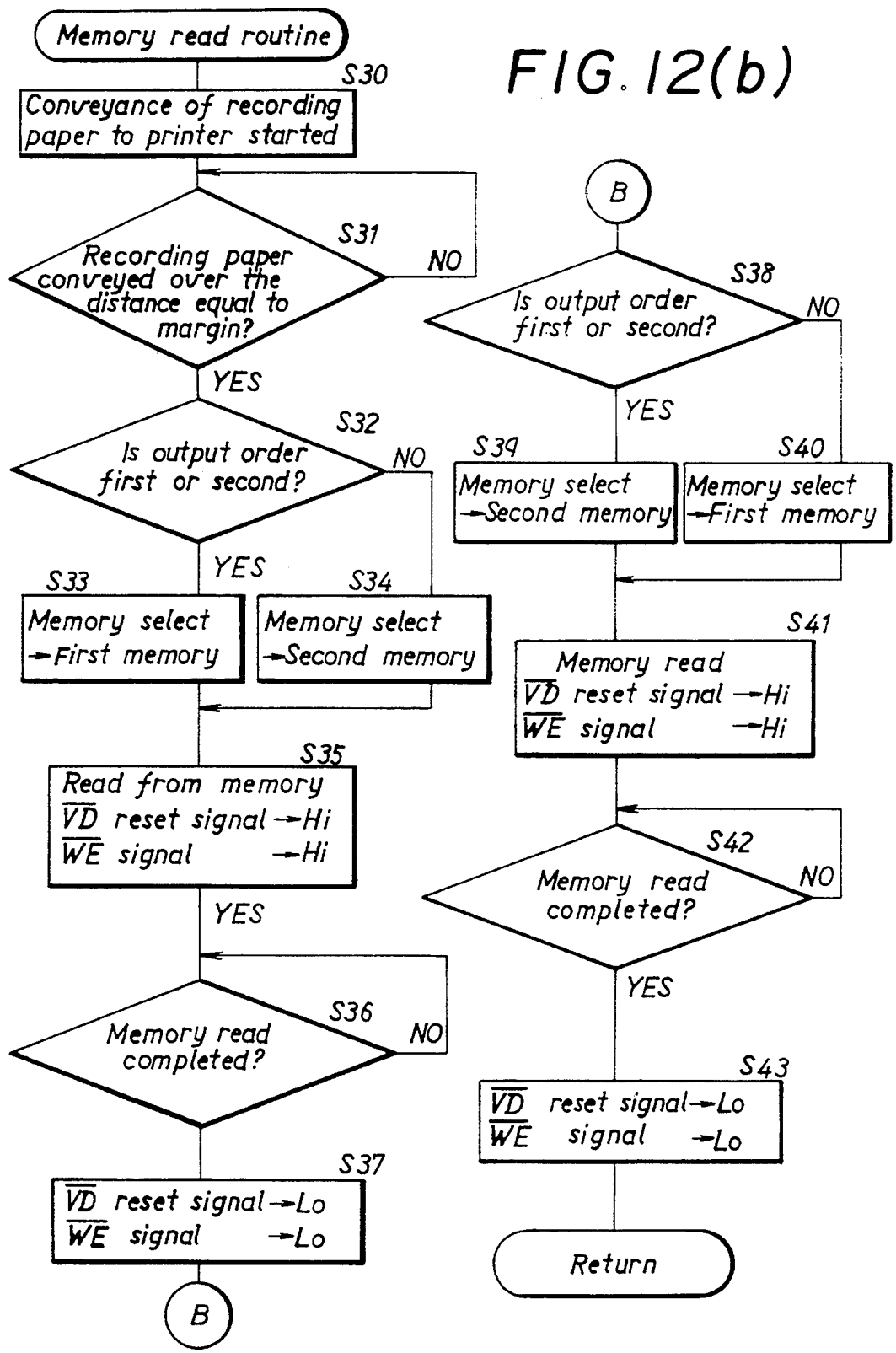
FIG. 12 is a flow chart illustrating a scale reading routine.

The routine for reading out image data from the memory is as illustrated in FIG. 12. For the printing of image data on the recording paper, the conveyance of the recording paper within the printer 2 is started (S30) and the fact that the recording paper has been conveyed over the distance equal to the required margin is detected (S31) and, thereafter, the order in which the images are to be output is judged (S32). The memory select signal selects the first image memory 31 (S33) when the order of output of the images is the first to second images, whereas the memory select signal selects the second image memory 32 (S34) when the order is the second to first images. In the illustrated case, since the image on the obverse side (3A) is stored in the second memory 32, the judgment made at step S32 is NO and the memory select signal consequently causes a selector 37 to select the second image memory 32 (S34). The reset signal and the write enable signal are both set to Hi and the image data of the obverse side (3A) are read out of the second image memory 32 (S35) and output to the printer 2. After the fact that the output of the image data from the second image memory 32 has been completed is sensed (S36), the reset signal is switched to Lo (S37).

Then, for outputting the image on the reverse side, the order of output of images is judged (S38) and the memory select signal selects the second image memory 32 (S39) when the order of output of images is the first to second images or the memory select signal selects the first image memory 31 (S40) when the order of output of images is the first to second images. In the illustrated case, since the image of the reverse side (3B) is stored in the first memory 31, the judgment made at step S38 is NO and the memory select signal consequently causes the selector 37 to select the first image memory 31 (S40). The reset signal and the write enable signal are both set to Hi and the image data on the reverse side (3B) are read out of the first image memory 31 (S41) and output to the printer 2. When the fact that the output of the image data from the first image memory 31 has been completed is sensed (B42), the reset signal is switched to Lo (S43) to complete the reading of the image data for printing.

Now, the reading of images by the image sensor 20 will be described below.

Figure 6:
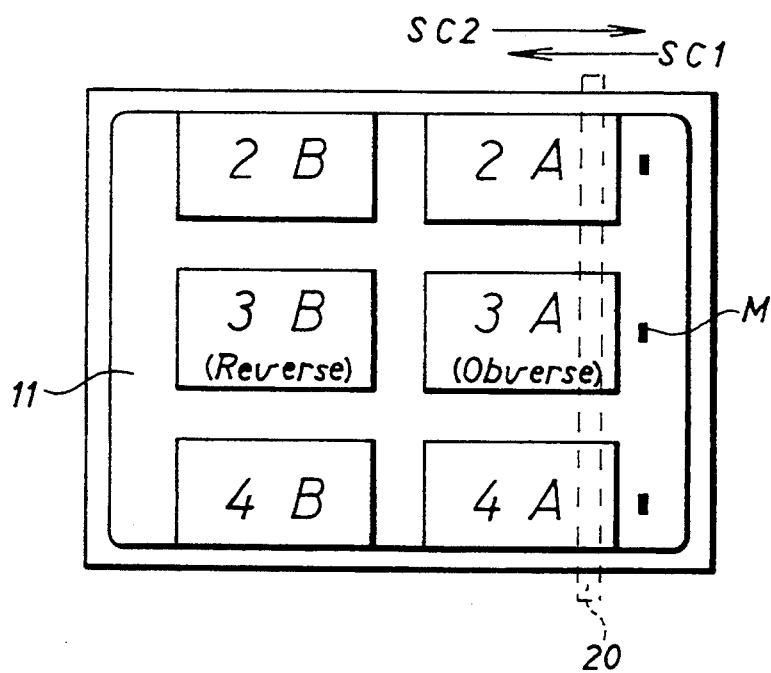
FIG. 6 is a plan view illustrating the state in which part of the images of the microfilm shown in FIG. 5 are projected on a screen.

For effecting the reading of images with the image sensor 20, first the image sensor 20 is moved in the direction indicated by the arrow mark SC1 in FIG. 6 to perform preliminary scanning and determine the positions of the images on the obverse and reverse sides. The regular scanning is carried out by moving the image sensor 20 in the direction indicated by the arrow mark SC2 based on the result of the judgment just mentioned. Prior to the regular scanning, the memory select signal for selecting between the first image memory 31 and the second image memory 32, the write enable signal for commanding a write enable, and the reset signal for commanding initiation of the address counter are put into the control circuit as illustrated in FIG. 13, depending on the position of the image sensor 20. Further, the R/W signal for commanding choice between the write mode and the read mode of the image data is put into the control circuit.

Then, the writing into the memory 31 and the reading out of the memory 32 of the image data which have been read in by the image sensor 20 as shown above will be described below.

Figure 14A:
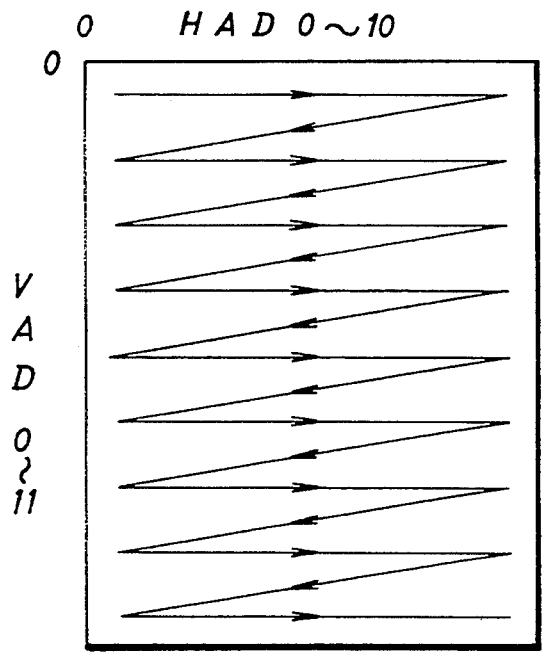
FIGS. 14(a) and 14(b) are schematic diagrams illustrating the basic concept of the procedure for addressing image data to a memory in the process of image writing.
Figure 14B:
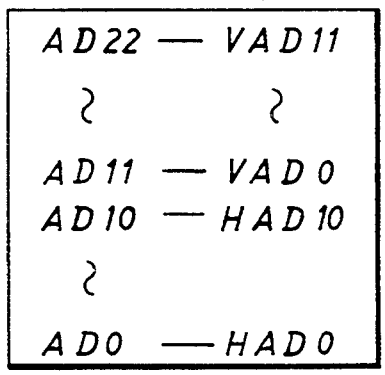

The writing of given image data in the memory is effected by causing the portion of the data proportionate to one line of the image sensor 20 to be read out at a prescribed pitch in the direction of the regular scanning indicated by the arrow mark SC2, namely in the direction of the auxiliary scanning. By the fact that the image sensor 20 moves in the direction of the auxiliary scanning, the image data are written in the first image memory 31 and the second image memory 32. The basic concept as to the choice of the order of writing in the memory map relative to the respective memories 31 and 32 is as illustrated in FIG. 14. To be specific, one set of addresses AD0 to 22 for one image is divided into two areas, one for the upper order addresses and the other for the lower order addresses and the lower order addresses AD0 to 10 are assigned to the main scanning addresses "HAD0 to 10" and the upper order addresses AD11 to 22 to the auxiliary scanning addresses "VAD0 to 10."

FIG. 14 (A) represents the addresses of the image data and FIG. 14 (B) represents the allocation to the addresses AD0 to 22 within the apparatus.

Then, for the purpose of causing the image data written in memories 31 and 32 as described above to be read out as rotated by 90°, the main scanning addresses and the auxiliary scanning addresses are interchanged for the upper order addresses and the lower order addresses preparatorily to the reading. To be specific, HAD0 to 11 are used for the upper order addresses and VAD0 to 10 for the lower order addresses. By causing the image data which have been written in as shown by the routine for writing illustrated in FIG. 11 to be read out as illustrated in FIG. 15, therefore, the image data are rotated by 90° and output via the selector 37.

Figure 15A:
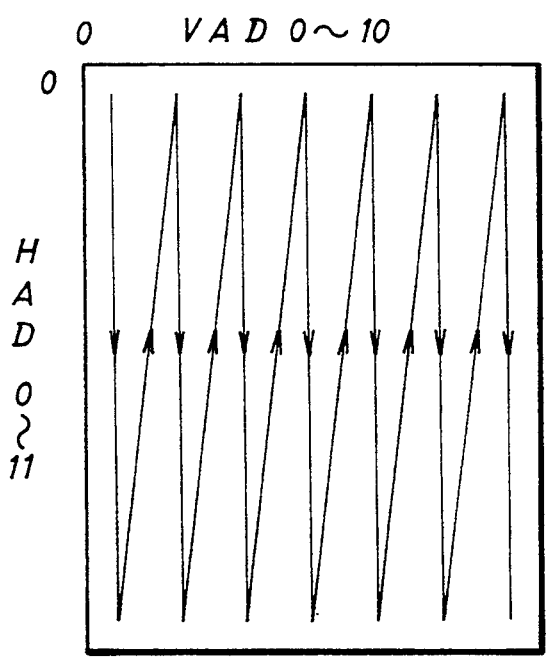
FIGS. 15(a) and 15(b) are schematic diagrams illustrating the basic concept of the procedure for addressing image data to a memory in the process of image reading.
Figure 15B:
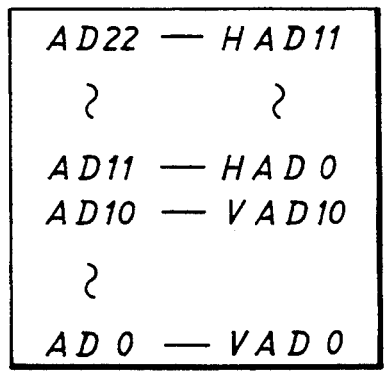

FIG. 15 (A) represents the addresses of the image data and FIG. 15 (B) represents the allocation to the addresses AD0 to 22 within the apparatus.

The illustrated embodiment represents the case of causing the image data written in the two memories 31 and 32 to be rotated by 90° at the time that they are read out. Optionally, the two images may be written in the frame memory for the whole recording paper and the image data may be relocated within the memory in accordance with the control signal from the CPU. Though the invention has been thus far described as embodied in handing the two images, i.e. the obverse and reverse images, of the check, it is able to deal with more images by using a plurality of memories.

In accordance with the first aspect of this invention described above, a plurality of images recorded and arranged in a prescribed posture on an original document can be given a change in arrangement and can be output in an arbitrarily changed order by one scanning motion of the image sensor. By using a recording paper, for example, and printing the images in a free layout thereon during output, the operation of image reading can be carried out smoothly.

Now, the application of image reading apparatuses according with the second and third aspects of this invention to a microfilm scanner will be described below.

Since the construction of the microfilm scanner 1 to be used herein is identical with that which is illustrated in FIGS. 1 to 4 described above, it will be omitted from the description to be given below.

Figure 16:
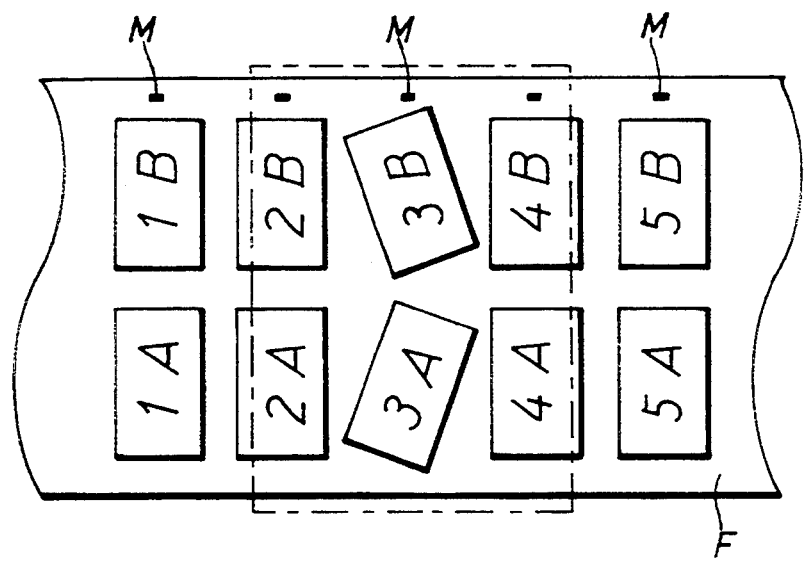
FIG. 16 is a plan view illustrating another example of part of a microfilm in which a plurality of image frames are linearly copied.
Figure 17:
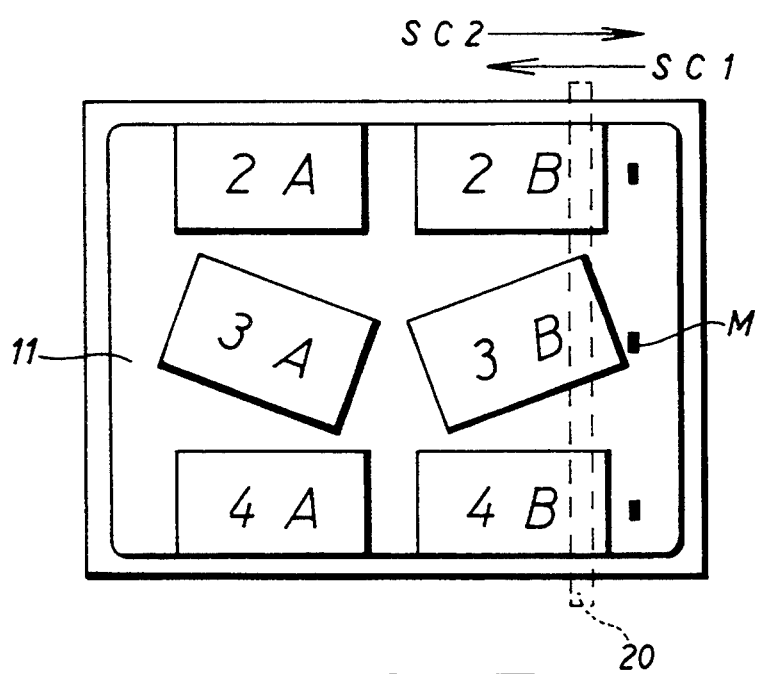
FIG. 17 is a front view illustrating the state in which part of the images of the microfilm shown in FIG. 16 are projected on a screen.

The images on the duplex type microfilm F which is an original document to be read out by microfilm scanner 1 are as illustrated for example in FIG. 16. As illustrated in the diagram, the images 3A and 3B are each photographed in an inclined state in the film F. When this film F is read out by the microfilm scanner 1 and projected on the screen 11, the part of the film F enclosed with an alternate one-long one-short dash line in FIG. 16 is rotated by 90° by prism 16 and the images inclined in the postures as illustrated in FIG. 17 are projected in such postures on the screen 11.

Figure 18A:
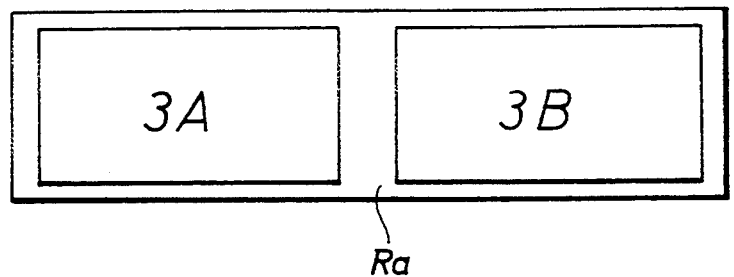
FIGS. 18(a) and 18(b) is a plan view illustrating a recording paper on which a plurality of images are printed.
Figure 18B:
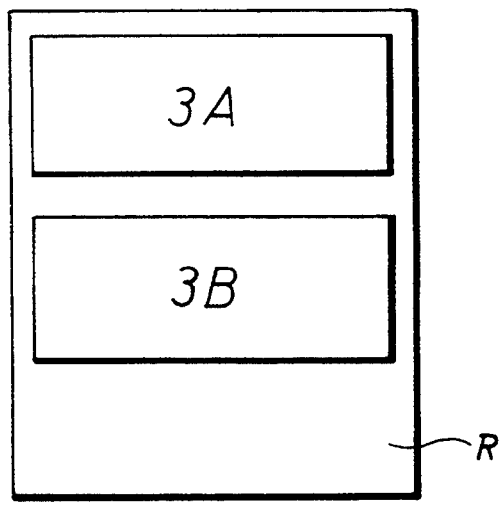

Even when some of the images contained in the film F are in an inclined state, the present microfilm scanner 1 enables the images to be printed out invariably in a corrected and erected state on a recording paper Ra of an oblong shape of a special size as illustrated in FIG. 18(a) or on a recording paper R of an A4 size or letter size as illustrated in FIG. 18(b).

Figure 19:
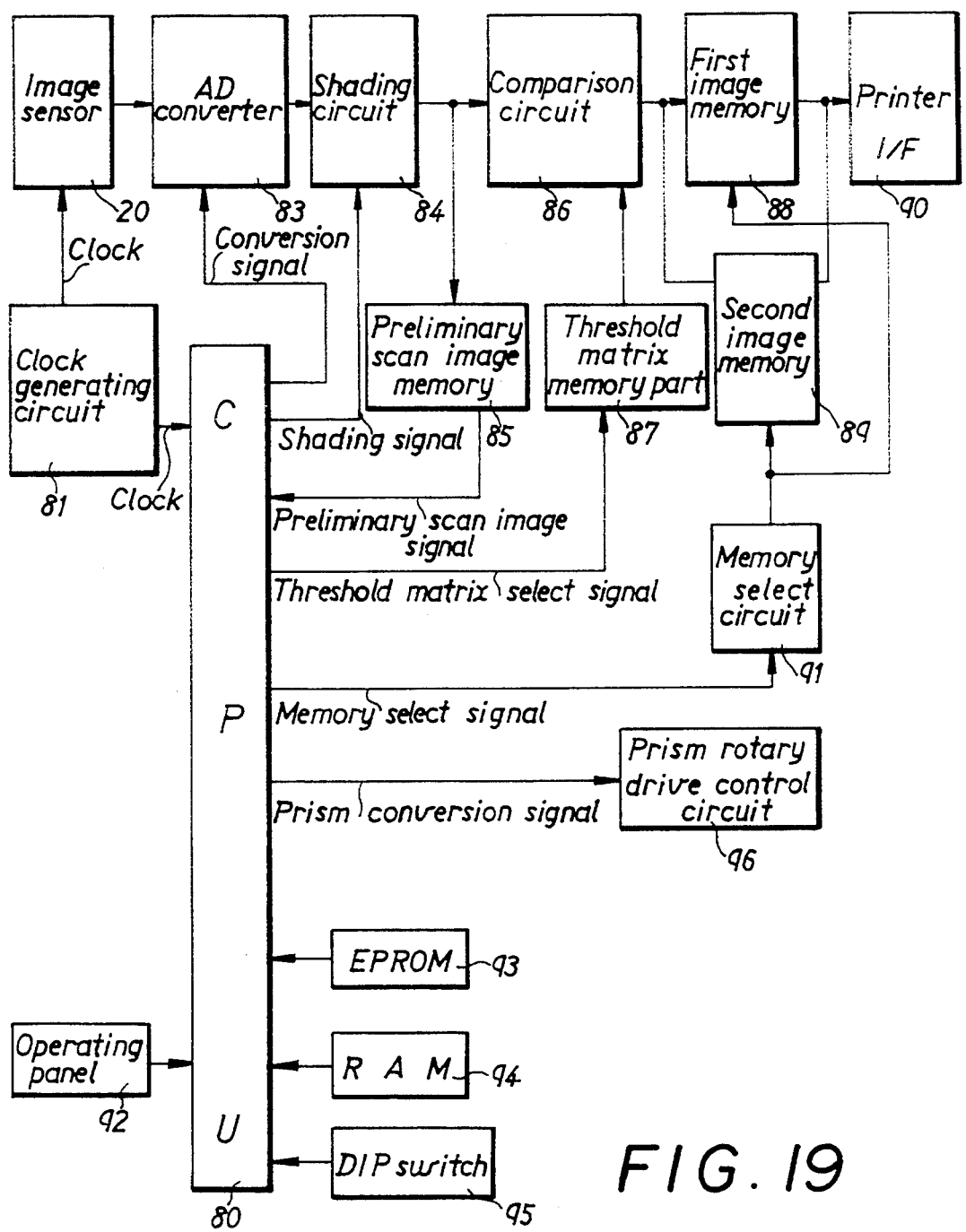
FIG. 19 is a block diagram illustrating a control circuit for an image reading apparatus.

The construction of the hardware for putting out inclined images in an erected state is illustrated in the block diagram of FIG. 19.

This apparatus is composed of a central processing unit (hereinafter abbreviated as "CPU") 80 for processing various sorts of data, a clock generating circuit 81 for issuing a reference signal (clock) to the CPU 80 and the image sensor 20, the image sensor 20 for scanning and reading in the images on the screen 11, an AD converter 83 for converting the analog signal read in by the image sensor 20 into the digital signal in response to the conversion signal from the CPU 80, a shading circuit 84 for extracting the necessary part from the image in storage in response to the shading signal from the CPU 80, a preliminary scan image memory 85 for memorizing an image in the process of preliminary scanning for the sake of detecting an inclination, if any, of the image, a comparison circuit 86 for comparing the density of an introduced image with the threshold value and effecting a pertinent binary conversion in response to the threshold signal, a threshold value matrix memory part 87 for memorizing a matrix and a threshold value preparatorily to the binary conversion of the image, a first image memory 88 for memorizing a first image in the process of regular scanning for reading in the image which has undergone correction of inclination, a second image memory 89 for memorizing a second image similarly in the process of regular scanning, a memory selection circuit 91 for effecting selection between the memories for the first image and the second image in the process of reading in and outputting the image in response to the memory selection signal from the CPU 80, a printer interface (I/F) 90 for effecting the output to the printer, a prism rotation controlling circuit 9t for effecting the control required for the rotation of the prism 16 in response to the prism rotation signal from the CPU, an operation panel 92 for operating the scanner 1, and an EPROM 93, a RAM 94, and a DIP switch 95 disposed inside the apparatus.

Figure 20:
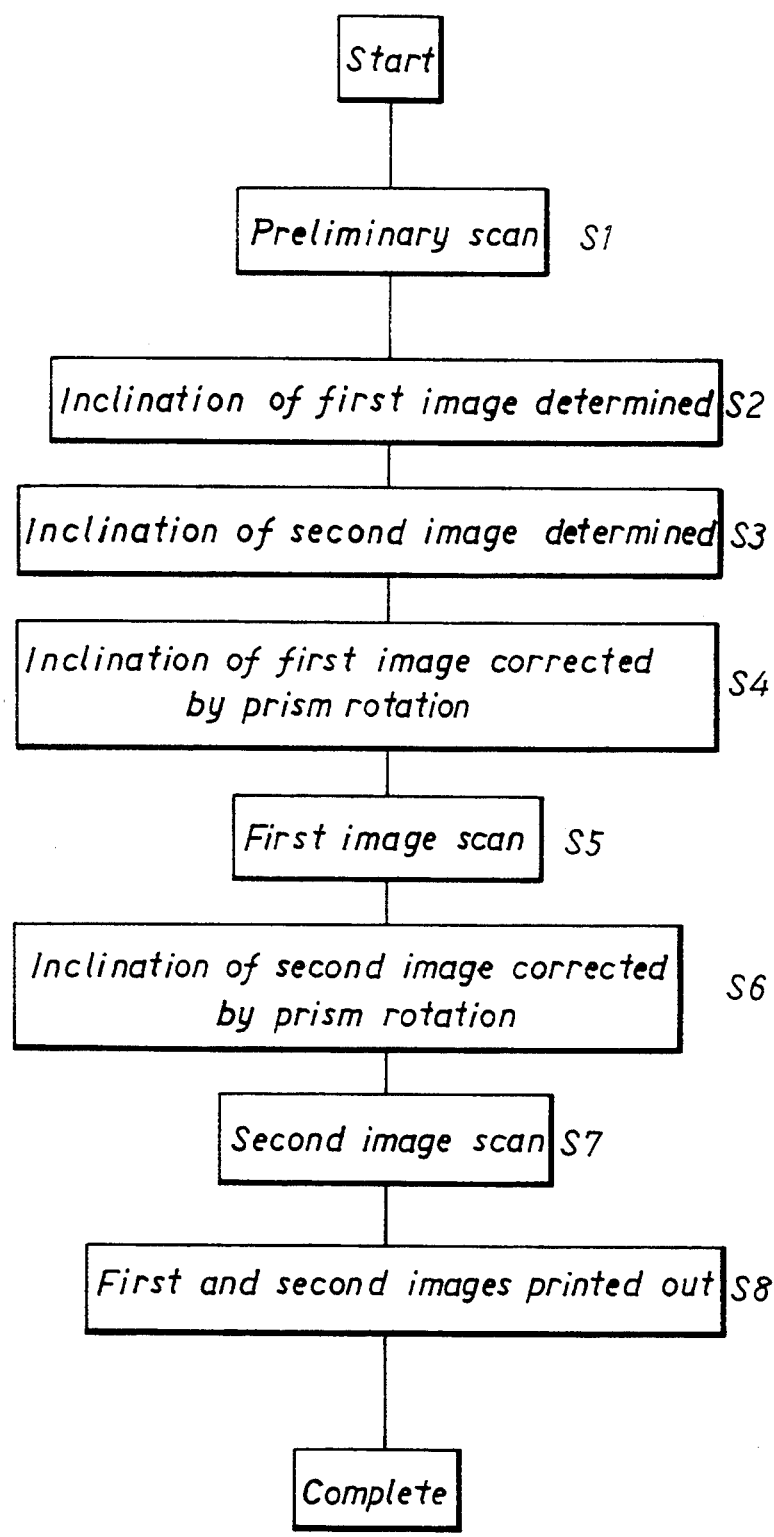
FIG. 20 is flow chart to assist in the description of the operation of correcting the inclination of an image in the image reading apparatus.

Now, the operation of the present apparatus for reading out an image photographed in an inclined state in a microfilm will be described with reference to the flow chart of FIG. 20.

First, the image is read in by subjecting the microfilm to preliminary scanning (S1) and the image data are memorized in the preliminary scanning image memory 85. From the image data thus read in, the inclination of the first image and that of the second image are found (S2 and S3). By rotating the prism 16 proportionately to the inclination of the first image, the first image to be projected on the screen 11 is corrected so as to be erected upright (S4). The first image thus erected upright is read in by scanning (S5) and memorized in the first image memory 88. By rotating the prism, the second image to be projected on the screen 11 is corrected so as to be erected upright (S6). The second image erected upright as described above is scanned (S7) and the relevant image data are memorized in the second image memory 89. The first image and the second image are synthesized and output as a synthetic image on the printer (S8).

Then, the method for finding an inclination, if any, of the image based on the image data read in by the preliminary scanning (S1) will be described below.

Figure 21B:
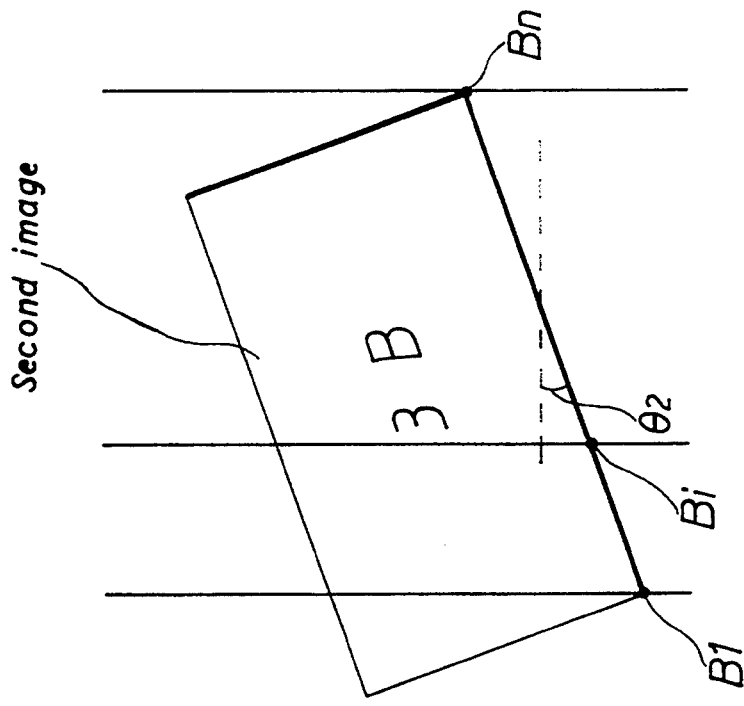
FIG. 21 is a diagram to assist in the description of the operation of detecting inclination of an image.
Figure 21A:
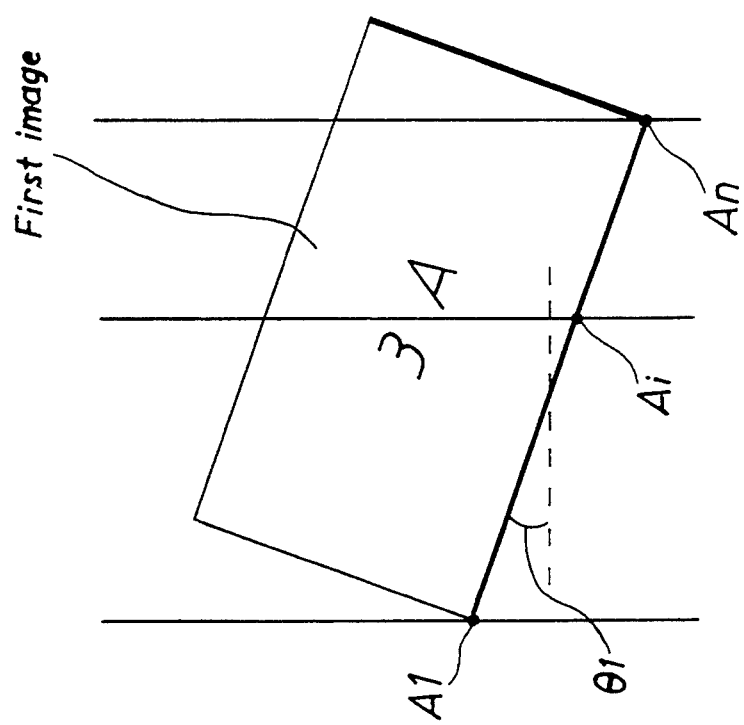

First, the CPU 80 searches through such image data as illustrated in FIG. 21 which are memorized in the preliminary scanning image memory 85 to detect a point Ai (i=1~n) and a point Bi (i=1~n) at which the data change from black to white or from white to black. Here, Ai and Bi represent the points at which the first image and the second image respectively change from black to white or from white to black. Then, the inclinations of the sides of the first image and the second image are found by the following formulas (1) to (10) for calculation.

$$\text{Let } A1\ (x1, Y1), A2\ (X2, Y2), \ldots, An\ (Xn, Yn) \tag{1}$$

stand for varying coordinates of the point Ai and the rectilinear line, $$y = ax + b \tag{2}$$

stand for the side of the first image, and the values of a and b will be approximated by the following formula in accordance with the least squares method.

$$M0 = \sum_{m=1 \sim n} Xm \tag{3}$$

$$M1 = \sum_{m=1 \sim n} Xm^2 \qquad (4)$$

$$M2 = \sum_{m=1 \sim n} Xm \cdot Ym \qquad (5)$$

$$M3 = \sum_{m=1 \sim n} Ym \qquad (6)$$

$$a = (n \cdot M2 - M0 \cdot M3)/(n \cdot M1 - M0^2) \qquad (7)$$
$$b = (M3 - a \cdot M0)/n \qquad (8)$$

Then, the relation with the angle $\theta 1$ formed by the dotted line and the straight line (2) in FIG. 21 can be expressed by the following equation:

$$\sin \theta 1 = 1/(a^2+1)^{\frac{1}{2}} \qquad (9)$$

Thus, $\theta 1$ is expressed as follows.

$$\theta 1 = \sin^{-1}\{1/(a^2+1)^{\frac{1}{2}}\} \qquad (10)$$

This procedure also applies to the inclination, $\theta 2$, of the second image.

Based on the inclination, $\theta 1$, of the first image and the inclination, $\theta 2$, of the second image respectively relative to the dotted line in FIG. 21 which have been found as described above, the CPU 80 forwards the prism rotation signal to the prism rotation drive control circuit 96 and rotates the prism 16 by providing the pulse motor 43 for rotating the prism 16 so many pulses as are required for rotating the prism 16 by angles proportionate to the inclinations $\theta 1$ and $\theta 2$, with the result that the images are deprived of inclination.

When the inclination $\theta 1$ or $\theta 2$ of image is toward the right relative to the dotted line in FIG. 21, the inclination $\theta 1$ is taken as a positive value. When the inclination is toward the left, the inclination $\theta 2$ is taken as a negative value. As shown in the flow chart of FIG. 20, the angle of rotation of the prism 16 which is required for correcting the inclination of the first image by the prism rotation (S4) is $-\theta \frac{1}{2}$ and the angle of rotation of the prism 16 required for correcting the inclination of the second image by the prism rotation (S6) is $(\theta 1 - \theta 2)/2$. The prism 16 is rotated in such a direction that the image on the screen turns clockwise when the angle of rotation has a positive value. It is rotated in such a direction that the image turns counterclockwise when the angle of rotation has a negative value.

Now, the method for driving the image sensor will be described below.

Figure 22:
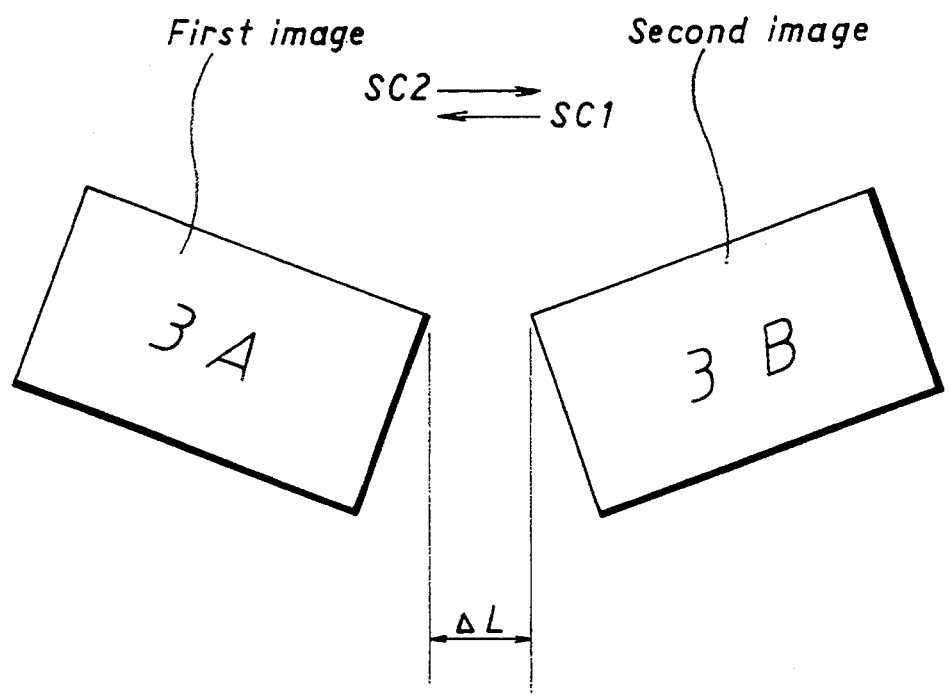
FIG. 22 is a diagram to assist in the description of the operation of detecting an interval between adjacent images.
Figure 23:
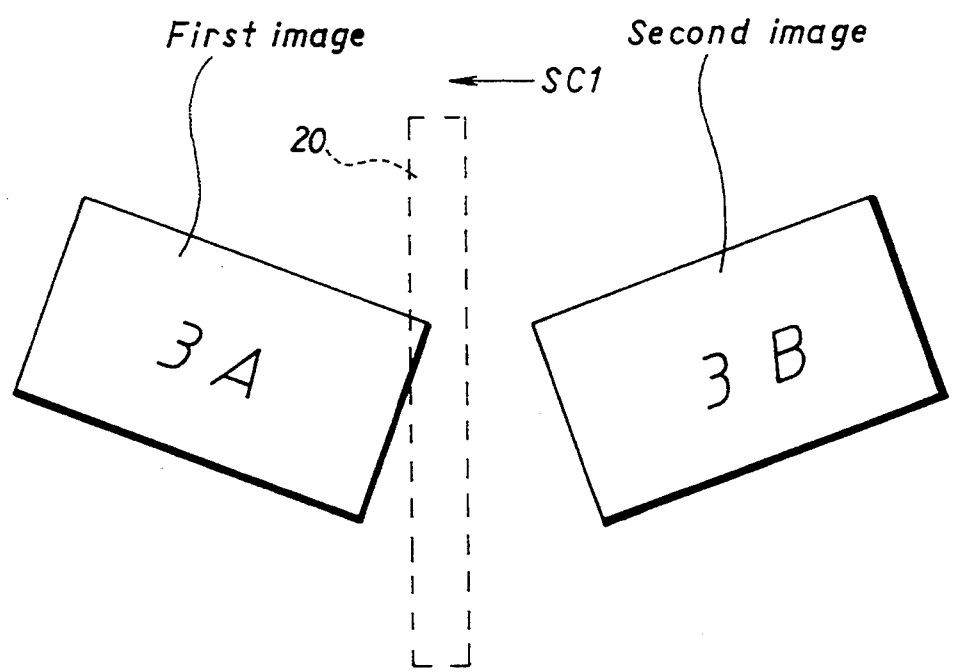
FIG. 23 is a diagram to assist in the description of the operation of driving a message sensor.

The image sensor 20 produces two scanning motions on the screen 11, i.e. the preliminary scanning in the direction from right to left (the direction of SC1) and the regular scanning in the direction from left to right (the direction of SC2). When two images having different inclinations are to be severally erected upright in the process of the regular scanning and the corrected images are to be read in by one scanning (in the direction of SC2), the images on the screen 11 are corrected by rotating the prism proportionately to their respective inclinations immediately before the images are severally scanned. Thus, the rotation of the prism for the purpose of erecting the second image must be carried out between the time the scanning of the first image is completed and the time the scanning of the second image is started. Let $\Delta L$ stand for the distance from the trailing end of the first image and the leading end of the second image as illustrated in FIG. 22, and the rotation of the prism for the second image will have to be completed while the image sensor 20 is in motion over the distance of $\Delta L$.

From the preliminary scan image data obtained by the preliminary scanning (S1), the value of $\Delta L$ and the inclinations of the first image and the second image are derived. The amount of rotation of the prism 16 is fixed by the magnitude of the inclination. The choice between the procedure of scanning the first image and the second image without stopping the operation of the image sensor 20 in the meantime and the procedure of stopping the operation of the image sensor 20 between the first image and the second image and starting the scanning of the second image after the rotation of the prism 16 has been completed is exercised on the basis of the time required for the rotation of the prism and the length of $\Delta L$. Depending on the length of $\Delta L$, the time required for the rotation of the prism may be secured by decelerating the scanning motion of the image sensor 20 without stopping the scanning between the two images. When the interval between the two images is too short to secure a sufficient approach run for the scanning of the second image, the image sensor 20 is returned toward the first image side over a distance necessary for acceleration and started again thence for scanning the second image.

In the scanning operation described thus far, the time required for the rotation of the prism is fixed proportionately to the amount of rotation of the prism determined by the inclination of the relevant image and the discrimination between the presence and absence of necessity for stopping the scanning operation between the two images is determined by comparing the time mentioned above and the length of $\Delta L$. As respects the amount of rotation of the prism, the discrimination between continuation and discontinuation of the scanning operation may be exercised by adopting the maximum time required for the rotation of the prism and comparing this maximum time with the length of $\Delta L$.

The scanning operation of the image sensor 20 described above consists in reciprocating the image sensor 20 on the screen for preliminary scanning (in the direction of SC1) and regular scanning (in the direction of SC2). When the scanning motion for reading out images is produced in only one direction, namely when the image sensor 20 is so constructed that the preliminary scanning is effected from right to left (in the direction of SC1)and, after the image sensor 20 is returned to the home position at right, the regular scanning motion is effected from right to left (in the direction of SC1), specifically when the obverse image and the reverse image of the check are symmetrically photographed, after the first image (the second image in this case) has been read in in the process of preliminary scanning, the preliminary scanning is discontinued by the time the image sensor 20 has verged on the first part of the second image and then the image sensor 20 is returned to the right.

The preliminary scanning fulfills the function of determining the density and inclination of the image and the distance $\Delta L$ between images. On the microfilm which has the obverse and reverse images of a check photographed thereon, the inclinations of these obverse and reverse images are symmetrical. By reading in the first image and consequently detecting the inclination of this image, the inclination of the second image can be automatically calculated from that of the first image. To be specific, when the inclination $\theta 1$ of the first image is calculated, the inclination $\theta 2$ of the second image may be found as $\theta 2 = -\theta 1$. Therefore the angle of rotation of the prism 16 for the correction of the inclination of the second image, is $\theta 1$. For the determination of the interval $\Delta L$ between the images, it is sufficient to find the trailing point of the first image and the leading point of the second image. As a result, the time for the preliminary scanning can be shortened in the case of the method of effecting the scanning only in one direction.

A recording paper Ra of a special size on which images read in by one regular scanning as described above are directly printed out in the order in which they were read in is illustrated in FIG. 18(*a*). This printing on a recording paper R of A4 size or letter size instead of the recording paper Ra of the special size as mentioned above can be accomplished as already explained by using the image reading apparatus according to the first aspect of this invention.

In this case, the hardware constructed as illustrated in FIG. 9 is added to the first image memory 88 and the second image memory 89 of the hardware of the construction illustrated in FIG. 19. The first image memory 31 and the second image memory 32 of FIG. 9 correspond to the first image memory 88 and the second image memory 89 of FIG. 19. In consequence of the addition thus made, the images can be printed out in a desired order of output with a margin inserted on the recording paper as illustrated in FIG. 8(*a*) or FIG. 8(*b*) besides FIG. 18(*b*).

The embodiment described above represents a case of causing image data written in the memories 31 and 32 to be output in the laser beam printer 2 so as to have images printed out on recording paper. The apparatus of this embodiment may be otherwise designed to have the image data output on the CRT or on such a recording medium as an optical disc in the place of the printer. Even when the image data are output in the printer, a plurality of images may be printed out individually on different sheets of recording paper instead of having them printed out on just one recording paper.

Further, while the present embodiment is depicted as using the DMP 3 in which the microfilm scanner 1 and the printer 2 constitute themselves independent entities, this invention can be embodied in a reader-printer in which the printer and the scanner themselves constitute an integral entity.

According to the second aspect of this invention, a plurality of images recorded on one single original document are read out by one scanning, the plurality of images thus read out are severally examined to determine whether or not they are inclined, and the images are corrected so as to be deprived of inclination, if any, and each output in an upright state. Even when a plurality of images recorded in an original document happen to contain an image recorded in an inclined state, one scanning motion is sufficient to output the images invariably in an upright state.

According to the third aspect of this invention, a plurality of images recorded on one single original document are projected collectively on a screen, the images thus projected are rotated round the optical axis as the center, they are examined to determine whether or not any of them is inclined, the plurality of images projected on the screen are read out in one scanning, and the images on the screen are corrected to be erected upright based on the results of the examination mentioned above before the images are severally read out. Even when the plurality of images recorded on an original document happen to contain an image in an inclined state, the inclined image is corrected to remove the inclination, and the images on the screen are confirmed to be invariably in an upright state and are read out in that state. Thus, the operation of reading out images can be accomplished with notably improved efficiency.

What is claimed is:

1. An image reading apparatus, comprising:
   image reading means for reading by one scanning one single original document including a plurality of images and space, and outputting image data of the original document;
   distinguishing means for distinguishing the plurality of images from the space in the original document on the basis of image data outputted by said image reading means;
   memory means for storing only image data of the plurality of images distinguished by said distinguishing means among image data outputted from said image reading means; and
   output means for outputting image data stored in said memory means in an order so that images represented by image data outputted by said output means are arranged in an order different from the order in which the plurality of images were arranged on the original document.

2. An image reading apparatus according to claim 1, wherein said output means is adapted to print out said plurality of images on one sheet.

3. An image reading apparatus according to claim 2, wherein said output means is adapted to print out said plurality of images severally at prescribed positions on said sheet.

4. An image reading apparatus according to claim 2, wherein said output means is adapted to print out said plurality of images as arranged in a direction perpendicular to the direction in which said images were arranged on said original document.

5. An image reading apparatus according to claim 2, wherein said output means is adapted to print out said plurality of images each in a state rotated by 90°.

6. An image reading apparatus according to claim 1, wherein said original document is a duplex type microfilm and said plurality of images are one pair of images photographed on said microfilm.

7. An image reading apparatus according to claim 6, wherein said reading means is adapted to scan said microfilm in the direction of width thereof.

8. An image reading apparatus according to claim 1, wherein said output means is provided with instructing means for instructing the sequence in which said plurality of images are to be output and said output means is adapted to output said plurality of images in the sequence instructed by said instructing means.

9. An image reading apparatus according to claim 8, wherein said memory means is provided with a plurality of memories and said plurality of images are stored severally in said plurality of memories.

10. An image reading apparatus according to claim 9, wherein said output means is adapted to alter the sequence in which said memories are put into operation in response to the instructions of said instructing means.

11. The image reading apparatus of claim 1, wherein the distinguishing means for distinguishing the plurality of images from the space in the original document is a CPU.

12. An image reading apparatus comprising:

image reading means for reading a plurality of images recorded at prescribed positions on one single original document by one scanning;

memory means for storing said plurality of images read out by said image reading means;

output means for causing said plurality of images stored in said memory means to be output in an order different from the order in which they were arranged on said original document;

judging means for judging inclinations of the plurality of images read by said image reading means; and correcting means for correcting inclinations of said plurality of images so as to be outputted by said output means in an upright state.

13. An image reading apparatus according to claim 12, wherein said judging means comprises means for detecting one side of the image read out by said reading means, means for calculating the inclination of the side detected as described above by the least squares method, and means for converting the calculated inclination into an angle.

14. An image reading apparatus according to claim 12, wherein said image reading means comprises preliminary scanning means and regular scanning means, said judging means is adapted to judge inclinations of images read by said preliminary scanning means, and said regular scanning means is adapted to read said plurality of images by one scanning after correction by said correcting means.

15. An image reading apparatus according to claim 14, wherein said preliminary scanning means is adapted to read out just one of said plurality of images and said judging means is adapted to detect an inclination, if any, in said image read out by said preliminary scanning means and effect judgment on the other images based on the inclination detected.

16. An image reading apparatus according to claim 14, wherein said original document is a duplex type microfilm and said plurality of images are one pair of images photographed on said microfilm.

17. An image reading apparatus according to claim 16, wherein said preliminary scanning means is adapted to read out just one of said plurality of images and said judging means is adapted to examine the image read out by said preliminary scanning means and determine whether or not the image is inclined and judge the inclination of the other image based on the detected inclination.

18. An image reading apparatus according to claim 17, wherein said judging means is adapted to judge the inclination of said other image to be $-\theta 1$ when the inclination of said one image is detected to be $\theta 1$.

19. A microfilm image reading system, comprising:

an image reader which reads out by one scanning a pair of images photographed and arranged in parallel relative to a first direction of a duplex type microfilm;

distinguishing means for distinguishing the pair of images on the basis of image data outputted by said image reader;

a memory which stores the pair of images distinguished by said distinguishing means; and output means for outputting the pair of images stored in said memory so that images outputted by said output means are arranged in a direction perpendicular to the direction in which the pair of images were arranged on the microfilm.

20. The microfilm image reading system of claim 19, wherein the pair of images are arranged parallel to a long side direction of the microfilm.

21. An image reading apparatus comprising:

image reading means for reading a plurality of images recorded at prescribed positions on one single original document by one scanning;

memory means for storing said plurality of images read out by said image reading means;

output means for causing said plurality of images stored in said memory means to be output in an order different from the order in which they were arranged on said original document;

projecting means for projection on a screen collectively the plurality of images of the original document;

image rotating means for rotating the images projected on said screen about an optical axis of said projecting means;

judging means for judging inclinations of said plurality of images projected on the screen; and drive means for driving said image rotating means, wherein said image reading means reads the images projected on the screen by one scanning in a direction in which said projected images are arranged, and said drive means drives said image rotating means according to results of the judgement of said judging means so that each of the projected images is erected upright on said screen before each of said plurality of images are read.

22. An image reading apparatus according to claim 21, wherein said original document is a duplex type microfilm and said plurality of images are a pair of images photographed on said microfilm.

23. An image reading apparatus according to claim 22, wherein said judging means is adapted to detect the inclination of one of said pair of images and judging the inclination of the other image based on the detected inclination.

24. An image reading apparatus according to claim 23, wherein said judging means is adapted to judge the inclination of said other image to be $-\theta 1$ when the inclination of said one image is found to be $\theta 1$.

25. An image reading apparatus according to claim 24, wherein said image rotating means comprises a prism and said drive means is adapted to rotate said prism by an angle of $-\theta\frac{1}{2}$ immediately before said reading means reads out said one image and rotate said prism by an angle of $\theta 1$ immediately before said reading means reads out said other image.

26. An image reading apparatus according to claim 21, wherein said image rotating means comprises a prism and said drive means is adapted to rotate said prism round said optical axis.

27. An image reading apparatus according to claim 26, wherein said plurality of images are a pair of images and said drive means is adapted to rotate said prism by an angle of $-\theta\frac{1}{2}$ before said reading means reads out said one image and, after said one image has been read out, rotate said prism by an angle of $(\theta_1-\theta_2)/2$ before said other image is read out when said judging means judges the inclination of said one angle to be $\theta 1$ and the inclination of said other angle to be $\theta 2$.

28. An image reading apparatus according to claim 26, wherein said image reading means comprises an image sensor and scanning means for causing said image sensor to produce a scanning motion on the image projected on said screen, and said drive means is adapted to rotate said prism when said image sensor assumes a position in an area in which said plurality of images are projected on said screen.

29. An image reading apparatus according to claim 28, wherein said scanning means is adapted to decelerate said image sensor when said image sensor reaches a position in an area in which said plurality of images are projected.

30. An image reading apparatus according to claim 28, wherein said scanning means is adapted to stop said image sensor when said image sensor reaches a position in an area in which said plurality of images are projected on said screen.

31. An image reading apparatus according to claim 30, wherein said scanning means is adapted to return said image sensor to the upstream side in the direction of scanning after said drive means has rotated said prism and restart said image sensor to the downstream side thereafter.

* * * * *